Nov. 12, 1963        S. BERLINSKY        3,110,135
GEAR CUTTING APPARATUS
Filed Nov. 6, 1961        2 Sheets-Sheet 1
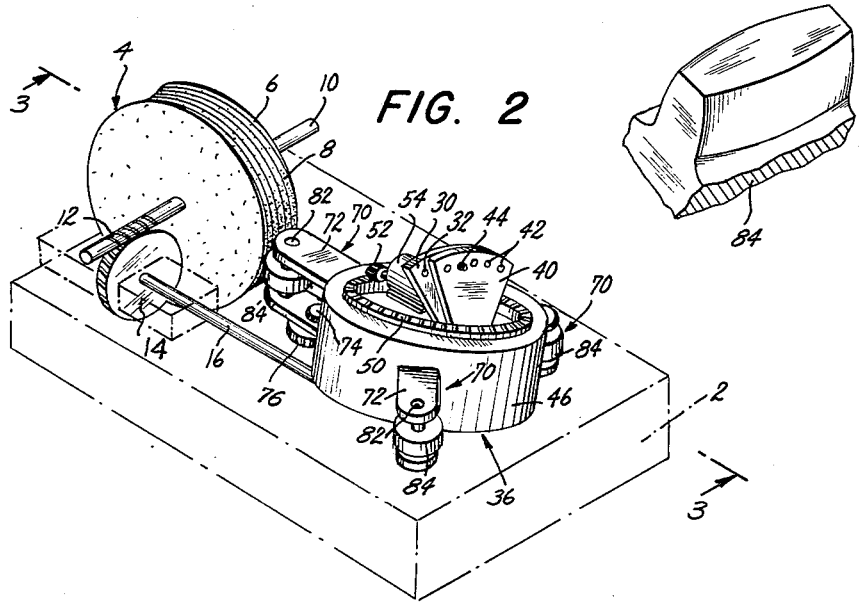
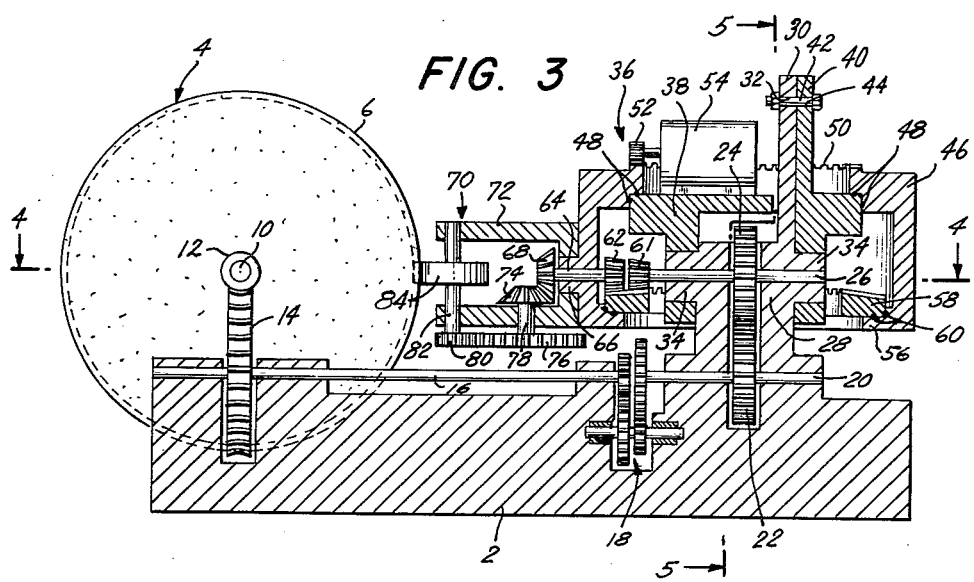
INVENTOR.
SHMUEL BERLINSKY
BY
James and Franklin
ATTORNEYS

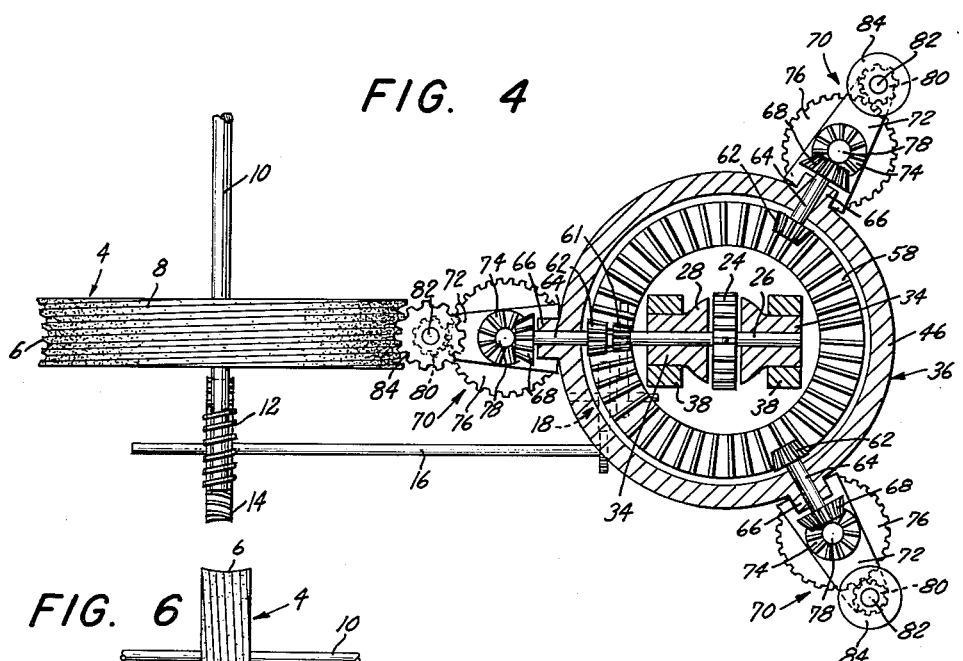
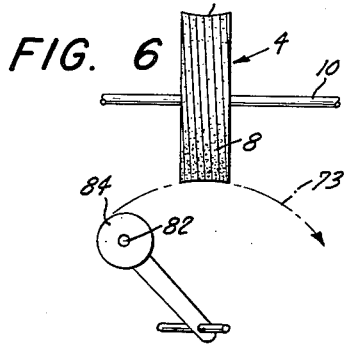
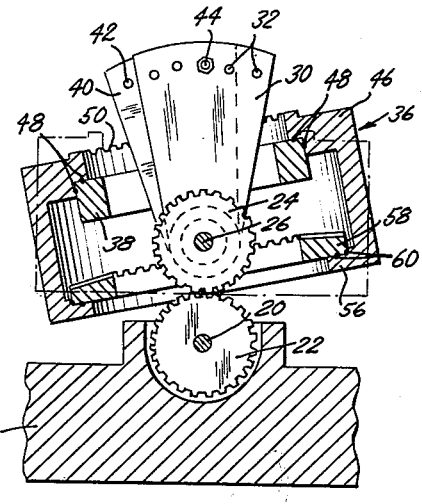
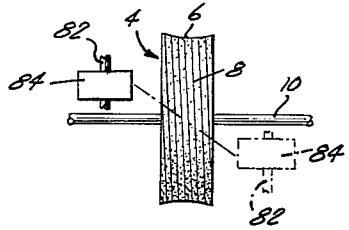

United States Patent Office 3,110,135
Patented Nov. 12, 1963

3,110,135
GEAR CUTTING APPARATUS
Shmuel Berlinsky, Boston, Mass., assignor to Holtzer-
Cabot Corporation, a corporation of Delaware
Filed Nov. 6, 1961, Ser. No. 150,376
16 Claims. (Cl. 51—108)

The present invention relates to apparatus for the cutting of gears of different types, and which is particularly adapted for the formation of gear teeth having an ellipsoid or crowned shape.

Use of gear teeth having an ellipsoid or crowned shape is becoming more and more prevalent because of the desirable dynamic characteristics of gears the teeth of which are thus shaped. A major drawback to the more extensive use of gear teeth of this type is the complexity of the equipment needed to cut them from the gear blank. Moreover, the cutting methods heretofore employed required such relative movements of the gear blank and the cutting element as to effectively prevent the adoption of mass production techniques. Each gear blank has had to be individually mounted on the cutting apparatus while that apparatus was idling, thus greatly reducing the productivity of a given piece of apparatus.

The present invention has as its prime object the provision of apparatus which permits the cutting of gear teeth, and particularly those having a crowned shape, efficiently, effectively and accurately, and in a manner consistent with quantity production. More specifically, the cutting of crowned gear teeth completely around a gear blank is accomplished in a continuous linear pass of the gear blank relative to the cutting element by means of a single simple movement. Not only does this permit the cutting of gear teeth of the desired shape in an efficient manner, but also permits the application of a turret technique, since each gear blank makes its pass in the same uniform direction. Hence while the apparatus is cutting one gear, a completed gear may be removed from the turret-type blank mounting means and a new blank inserted thereon, so that the apparatus may operate continuously, thus greatly increasing its production rate. The parts are so associated as to correlate and synchronize the relative movements of the cutting element and the gear blank, and optionally the movement of the blank-mounting turret may also be synchronized therewith, thus positively preventing damage either to the gear blank or to the cutting element.

In accordance with the present invention, the blank-cutting means comprises, as is relatively conventional, a wheel having a helical groove in its periphery the pitch of which corresponds to the pitch of the gear teeth to be cut. This cutting wheel is rotated about a first axis, here shown for purposes of exemplification as horizontal. The gear blank is adapted to be supported on a mounting means and to be rotated about a second axis which is normally substantially perpendicular to the first axis but which may be adjusted to make any desired angle with the first axis. Suitable gearing interconnects the cutting wheel and the gear blank so that the two are rotated in synchronism, taking into account the pitch of the helical groove on the operative surface on the cutting wheel. The gear blank mounting means is itself mounted for rotation about a third axis displaced from the second axis and nominally perpendicular to the first axis (and to the second axis as well) but the orientation of which can be adjusted relative thereto so as to be at an angle other than 90° relative thereto. As the gear mounting means rotates about said third axis, the gear blank is moved into and out from engagement with the cutting wheel. The operative surface of the cutting wheel is concave, its concavity being related to the distance between it and the third axis about which the mounting means rotates.

When the third axis is inclined from a direction at right angles to the first axis, the gear blank carried thereby will so engage the helical groove on the operative surface of the cutting wheel as to form gear teeth of ellipsoid or crowned shape. Adjustment of the angle which the third axis makes relative to the first axis will determine the degree of crowning imparted to the gear teeth.

The gear blank mounting means may be provided with a plurality of angularly spaced gear blank mounts, only one of which at any time is in operative engagement with the cutting element. While one gear blank is being cut, therefore, the other gear blank mounts are available for removal and replacement of gear blanks, all without interrupting the cutting process which is going on.

By reason of the arrangement of operative elements there is, apart from the rotation of the cutting wheel and the gear blank, relative movement of those two elements in a single direction and along an uncomplicated line which, insofar as the blank and the cutting wheel are concerned, may be described as an inclined substantially straight line having a component across the width of the operative face of the cutting wheel and a component at right angles thereto, the degree of the right angle component being determined by the inclination of the third axis (about which the blank mounting means is rotated) relative to a direction at right angles to the first axis (about which the cutting wheel is rotated).

To the accomplishment of the above, and to such other objects as may hereinafter appear, the present invention relates to the construction and arrangement of gear cutting apparatus as defined in the appended claims and as described in this specification, taken together with the accompanying drawings, in which:

FIG. 1 is a fragmentary three-quarter perspective view, on an enlarged scale, of a crowned gear tooth of the type which the apparatus of the present invention is specifically designed to form;

FIG. 2 is an idealized three-quarter perspective view of the apparatus of the present invention;

FIG. 3 is a cross sectional view taken along the line 3—3 of FIG. 2;

FIGS. 4 and 5 are cross sectional views taken along the lines 4—4 and 5—5 respectively of FIG. 3;

FIG. 6 is a diagrammatic top plan view showing one aspect of the relative movement of the gear blank and the cutting element; and FIG. 7 is a diagrammatic front elevational view showing another aspect of the relative movement of those parts when the third axis makes an angle other than 90° with the first axis.

As here specifically disclosed, the apparatus comprises a base 2 on which the operative parts are mounted. The cutting element, generally designated 4, may be in the form of an abrasive wheel the cutting edge 6 of which is concave and is provided with one or more spiral grooves 8 the pitch of which corresponds to the pitch of the gear teeth which are to be cut. The wheel 4 is rotatable about an axis defined by the shaft 10 on which the wheel 4 is fast, that shaft 10 being mounted on the base 2 in any appropriate manner and being driven in rotation in any appropriate manner, as by operative connection to an external motor. The shaft 10 is provided with a worm 12 which engages with a worm wheel 14 mounted on the base 2 and fast on shaft 16. An assembly of change gears 18 connects the shaft 16 to shaft 20 mounted on the base 2, the shaft 20 having a gear 22 thereon which meshes with gear 24 mounted thereabove and fast on shaft 26 which is journaled in an upstanding part 28 of the base 2. A plate 30 is fixed to and extends up above the base part 28 and is provided with a plurality of arcuately arranged apertures 32.

The base part 28 is provided with a pair of oppositely extending projecting hubs 34 on which the gear blank mounting means, generally designated 36, is mounted for rotative adjustment. The gear blank mounting means 36 comprises a central supporting structure 38 which is journaled on the parts 34 for rotation thereabout and which is provided with an upstanding plate 40 provided with an arcuately arranged set of apertures 42, the plate 40 sliding over the plate 30 and the apertures 42 registering with the apertures 32, the two plates 30 and 40 being held in adjusted position in any appropriate manner, as by a bolt 44 which passes through a selected pair of registering apertures 32 and 42. A rotary turret-like head 46 is mounted on the central structure 38 by means of bearing races 48 so as to be rotatable about an axis, generally vertical as shown in the drawings, and which may be considered as parallel to the vertical centerline of the upwardly extending plate 40. The head 46 may be driven in rotation by means of a ring of gear teeth 50 on its upper surface engaged by pinion 52 rotated by a driving means such as the motor 54, which as specifically disclosed is mounted on the central supporting structure 38, which may optionally be synchronized with the rotation of the shaft 10 and the cutting wheel 4.

The head 46 is provided with a bottom flange 56 on which a ring gear 58 is rotatably mounted, as by the bearings 60. This ring gear 58 is engaged by pinion 61 carried by shaft 26, and engages with a plurality of pinions 62 (only one of which is shown in FIG. 3), each of the pinions 62 being fast on shaft 64 extending out through hub 66 and carrying bevel gear 68 on the end thereof.

The gear blank mounting means proper, generally designated 70, comprises a bracket 72 which is adjustably rotatably mounted on the hub 66, and which is adapted to be fixed in adjusted rotative position in any appropriate manner, as by friction. It carries bevel gear 74 which meshes with gear 68 and which is connected to external gear 76 by shaft 78, the external gear 76 meshing with gear 80 which rotates shaft 82. A gear blank, generally designated 84, is adapted to be mounted on the shaft 82 for rotation therewith. Any appropriate means may be provided for permitting removal and replacement of the gear blanks 84. As here shown the head 46 carries three individual gear blank mounts 70, equally angularly spaced around the periphery thereof, but any desired number of such mounts 70 could be employed. The change gear assembly 18 and the gears 76 and 80 are replaceable, so that different gear ratios may be produced thereby.

In operation rotation of the shaft 10 will cause the cutting wheel 4 to rotate and, through the gears 12, 14, 18, 22, 24, 58, 61, 62, 68, 74, 76 and 80, the gear blank 84 will be rotated about the axis of the shaft 82 at a fixed relative speed, that speed being determined by the design of the gear teeth to be cut and by the configuration of the grooved cutting surface 6 of the cutting wheel 4. While the cutting wheel 4 and gear blank 84 are thus rotated, the motor 54 causes the head 46 to rotate at a predetermined speed, thus bringing one of the gear blank mounts 70 into engagement with the cutting wheel 4. Assuming that rotation of the head 46 is in a clockwise direction as viewed from the top of FIG. 2 (see the arrow 73 in FIG. 6), the gear blank 84 will therefore first be brought into engagement with the left hand side of the cutting surface of the wheel 4 and then moved across that cutting surface, leaving it at its right hand side. If the axis about which the head 46 rotates is vertical (see the broken line showing in FIG. 5) this movement of the gear blank 84 will be horizontal, and gear teeth of relatively concave shape will be formed thereon. If, however, the axis about which the head 46 rotates is inclined from the vertical, as shown in FIG. 2 and in solid lines in FIG. 5 of the drawings, there will be, in addition to the horizontal component of movement of the gear blank 84 relative to the cutting wheel 4 (such as is shown in FIG. 6), a vertical component of movement, such as is illustrated in FIG. 7. By reason of these two components of movement different longitudinal portions of the teeth will be differently acted upon by the grooves 8 in the cutting wheel 4, with the result that the gear teeth will have a generally straight or convex form of teeth, the extent of the convexity being determined by the degree to which the axis about which the head 46 rotates is inclined relative to the vertical. In addition it is expected that the teeth will assume a crowned or elliptoid shape as shown in FIG. 1.

For each setting of the axis of the head 46, the gear blank mounts 70 are preferably rotatably adjusted relative to the head 46, as by rotation about the hubs 66, so that, when gear teeth parallel to the axis of the gear blank are desired, the axis of the shafts 82 carried thereby, as the gear blanks 84 mounted thereon are moved across the operative face of the cutting wheel 4, will be substantially perpendicular to the axis of the cutting wheel shaft 10 (see FIG. 7), taking into account, of course, the lead of the helical groove 8 formed in the cutting surface 6 thereof. It will be appreciated that the nature of the driving gearing disclosed permits the adjustments described. Thus the rotative mounting of the gear 58 on the head 46 permits rotative drive to the shaft 82 while permitting rotation of the head 46 about its axis at an independently controlled rate, and the beveled nature of the gears 68 and 74 permits rotative adjustment of the mounts 70 relative to the head 46 without interfering with rotative drive of the gear blanks 84.

Changing the specific gears used in the change gear assembly 18 will accommodate for changes in the pitch of the groove 8 formed in the cutting surface 6 of the cutting wheel 4, while changing of the gears 76 and 80 will accommodate for the production of different numbers of teeth on the gear blank 84. Since the shaft 10, on which the cutting wheel 4 is mounted, is positively coupled to the shaft 82, on which the gear blank 84 is coupled, the relative rotations of the wheel 4 and blank 84 are positively related, so that there can be no damage to the cutting wheel 4 as the blank 84 is moved thereover no matter at what speed the parts may be driven.

By reason of the fact that the axis about which the head 46 is adapted to be rotated is skewed relative to the axis of the shaft 10, it will be apparent that the gear blank 84 is moved across the cutting face of the wheel 4 in a single pass and in a uniform direction, the relative speeds of rotation of the gear blank 84 and of the head 46 being so related that in a single pass the entire periphery of the gear blank 84 will have gear teeth cut thereon, and those teeth will have a crowned or elliptoid shape. While the relative speeds of rotation of the various parts are interrelated for any given setup, all of those operating conditions can be adjusted and varied at will, and the degree of skew can be varied at will to produce gear teeth of different shapes, thus rendering the apparatus extremely adaptable.

The concavity of the cutting surface 6 on the cutting wheel 4 is such as to have an effective radius of curvature substantially equal to the distance between that surface 6 and the axis about which the head 46 rotates.

Because of the single-pass feature which is characteristic of the apparatus here disclosed, it permits the adoption of turret-type quantity production techniques. The machine may be operated continuously, and while teeth are being cut in a given gear blank 84 carried by one of the mounts 70, the other mounts 70 are made available for the removal of finished gear blanks 84 and their replacement with uncut gear blanks 84. Thus the machine may be loaded and unloaded without interrupting its operation and without slowing down its productivity.

The apparatus here disclosed is, for the operations which it performs, exceptionally simple and direct acting, yet capable of the same degree of accuracy as the much more complicated machines previously employed for the same purpose. It is, however, considerably less expensive than such prior art machines and has a higher rate of productivity.

While but a single embodiment of the present invention has been here disclosed, it will be apparent that many variations may be made therein, all within the scope of the instant invention as defined in the following claims.

I claim:

1. Gear cutting apparatus comprising a cutting element mounted for movement about a first axis, gear mounting means arranged to mount a gear blank to be cut, means for supporting said gear blank mounting means for movement about a second axis displaced from and at an acute angle relative to said first axis, and means for moving said gear mounting means about said second axis to bring a gear blank carried thereby into and out of operative engagement with said cutting element.

2. In the apparatus of claim 1, means for adjusting the angle which said second axis makes relative to said first axis.

3. The apparatus of claim 2, in which said cutting element has a concave cutting surface, the concavity of said surface corresponding to the distance thereof from said second axis.

4. The apparatus of claim 1, in which said cutting element has a concave cutting surface, the concavity of said surface corresponding to the distance thereof from said second axis.

5. Gear cutting apparatus comprising a cutting element mounted for movement about a first axis, gear mounting means arranged to mount a gear blank to be cut in a position substantially perpendicular to a second axis, said second axis being substantially perpendicular to said first axis, and means for supporting said gear mounting means for movement about a third axis displaced from said first and second axes and at an acute angle relative to said first axis, and means for moving said gear mounting means about said third axis to bring a gear blank carried thereby into and out of operative engagement with said cutting element.

6. In the apparatus of claim 5, means for adjusting the angle which said third axis makes relative to said first axis.

7. The apparatus of claim 6, in which said cutting element has a concave cutting surface, the concavity of said surface corresponding to the distance thereof from said third axis.

8. In the apparatus of claim 6, means for driving said cutting element in rotation about said first axis and synchronizingly rotating said gear blank in said gear mounting means about said second axis.

9. In the apparatus of claim 6, means for driving said cutting element in rotation about said first axis, synchronizingly rotating said gear blank in said gear mounting means about said second axis, and synchronizingly actuating said means for moving said gear mounting means.

10. The apparatus of claim 5, in which said cutting element has a concave cutting surface, the concavity of said surface corresponding to the distance thereof from said third axis.

11. In the apparatus of claim 5, means for driving said cutting element in rotation about said first axis and synchronizingly rotating said gear in said gear mounting means about said second axis.

12. In the apparatus of claim 5, means for driving said cutting element in rotation about said first axis, synchronizingly rotating said gear in said gear mounting means about said second axis, and synchronizingly actuating said means for moving said gear mounting means.

13. In the apparatus of claim 5, means for adjusting the angle which said third axis makes relative to said first axis, said cutting element having a concave cutting surface the concavity of which corresponds to the distance thereof from said third axis, and means for driving said cutting element in rotation about said first axis and synchronizingly rotating said gear blank in said gear mounting means about said second axis.

14. In gear cutting apparatus, a gear cutting element, a turret structure mounted for rotation about a first axis displaced from said cutting element and having a plurality of gear blank mounts arranged therearound for bringing gear blanks carried thereby into and out of operative engagement with said cutting element, each of said egar blank mounts comprising means for rotating a gear blank mounted thereon about a second axis displaced from said first axis, and in which said first axis is angularly adjustable relative to said cutting element so as to be adjustably skewed relative to the effective plane of the cutting portion of said cutting element, and said second axis is angularly adjustable relative to said first axis so as to be maintainable at a desired angle relative to the effective plane of the cutting portion of said cutting element as said first axis is angularly shifted relative thereto.

15. The apparatus of claim 14, in which said gear cutting element is mounted for rotation about a third axis essentially perpendicular to said second axis and to the nominal position of said first axis, said first axis being acutely angularly adjustable relative to said nominal position.

16. In gear cutting apparatus, a gear cutting element, a turret structure mounted for rotation about a first axis displaced from said cutting element and having a plurality of gear blank mounts arranged therearound for bringing gear blanks carried thereby into and out of operative engagement with said cutting element, each of said gear blank mounts comprising means for rotating a gear blank mounted thereon about a second axis displaced from said first axis, and in which said gear cutting element is mounted for rotation about a third axis essentially perpendicular to said second axis and to the nominal position of said first axis, said first axis being acutely angularly adjustable relative to said nominal position.

References Cited in the file of this patent

UNITED STATES PATENTS

| | | |
|---|---|---|
| 1,212,552 | Pike | Jan. 16, 1917 |
| 1,712,256 | Colman | May 7, 1929 |
| 2,032,646 | Adams | Mar. 3, 1936 |
| 2,109,600 | Vanderbeek | Mar. 1, 1938 |
| 2,194,780 | Andersen | Mar. 26, 1940 |